(12) United States Patent
Laing et al.

(10) Patent No.: US 7,484,941 B2
(45) Date of Patent: Feb. 3, 2009

(54) ELECTRIC MOTOR WITH CIRCULATOR PUMP

(75) Inventors: Karsten A. Laing, La Jolla, CA (US); Zoltan Jagasics, Goegoelloe (HU)

(73) Assignees: Oliver Laing, Stuttgart (DE); Karsten Laing, Althuette (DE); Birger Laing, Marbach (DE)

( * ) Notice: Subject to any disclaimer, the term of this patent is extended or adjusted under 35 U.S.C. 154(b) by 0 days.

(21) Appl. No.: 10/265,308

(22) Filed: Oct. 3, 2002

(65) Prior Publication Data
US 2003/0222527 A1 Dec. 4, 2003

Related U.S. Application Data

(63) Continuation-in-part of application No. 10/151,809, filed on May 20, 2002, now Pat. No. 6,736,616.

(51) Int. Cl.
*F04B 35/04* (2006.01)
*H02K 1/22* (2006.01)
(52) U.S. Cl. .................... 417/423.7; 310/261
(58) Field of Classification Search .......... 417/423.7; 310/261
See application file for complete search history.

(56) References Cited

U.S. PATENT DOCUMENTS

| | | | | |
|---|---|---|---|---|
| 3,354,833 A | * | 11/1967 | Laing | 417/353 |
| 4,352,646 A | * | 10/1982 | Laing et al. | 417/420 |
| 4,471,835 A | * | 9/1984 | Laing et al. | 165/109.1 |
| 4,580,335 A | * | 4/1986 | Laing et al. | 29/598 |
| 4,614,887 A | * | 9/1986 | Ahner et al. | 310/166 |
| 4,620,120 A | * | 10/1986 | Laing | 310/166 |
| 4,658,166 A | | 4/1987 | Oudet | |
| 4,682,067 A | | 7/1987 | Oudet | |
| 4,730,989 A | * | 3/1988 | Laing | 417/357 |
| 4,866,323 A | | 9/1989 | Oudet et al. | |
| 4,880,362 A | * | 11/1989 | Laing et al. | 417/365 |
| 6,127,764 A | * | 10/2000 | Torok | 310/269 |

FOREIGN PATENT DOCUMENTS

| | | |
|---|---|---|
| DE | 45808 | 6/1887 |
| DE | 78075 | 5/1893 |
| JP | 09-112479 | 5/1997 |
| JP | 10-061583 | 3/1998 |
| JP | 10-184593 | 7/1998 |
| JP | 10-318186 | 12/1998 |

OTHER PUBLICATIONS

Minimotor SA Product Design Web Page Mar. 2, 2002 Minimotro SA, Switzerland.
The New Quantum Leap in Motor Technology: "Ferrous Loss-Free", date unknown.

* cited by examiner

*Primary Examiner*—Charles G Freay
(74) *Attorney, Agent, or Firm*—Lipsitz & McAllister, LLC

(57) ABSTRACT

To create an electric motor, comprising a rotor and a stator, whereby the rotor is spherically supported, which motor has a high efficiency, it is proposed, that the rotor produces a magnetic field, that the surface of the rotor facing the stator has a spherical configuration, that the rotor and stator are adapted to each other so that a maximal magnetic attraction force which keeps the rotor on the spherical bearing is larger than the maximal axial counterforce.

20 Claims, 8 Drawing Sheets

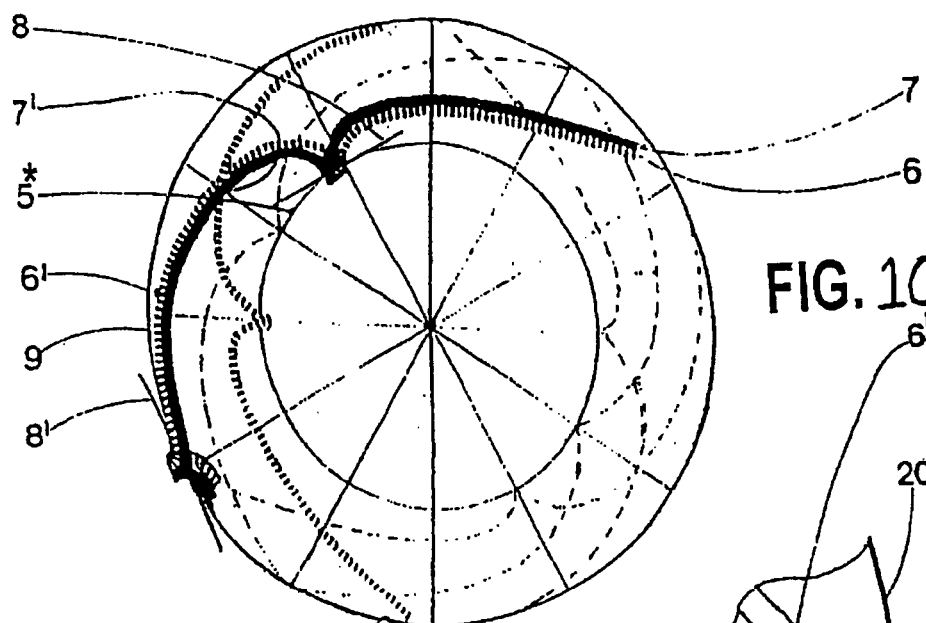
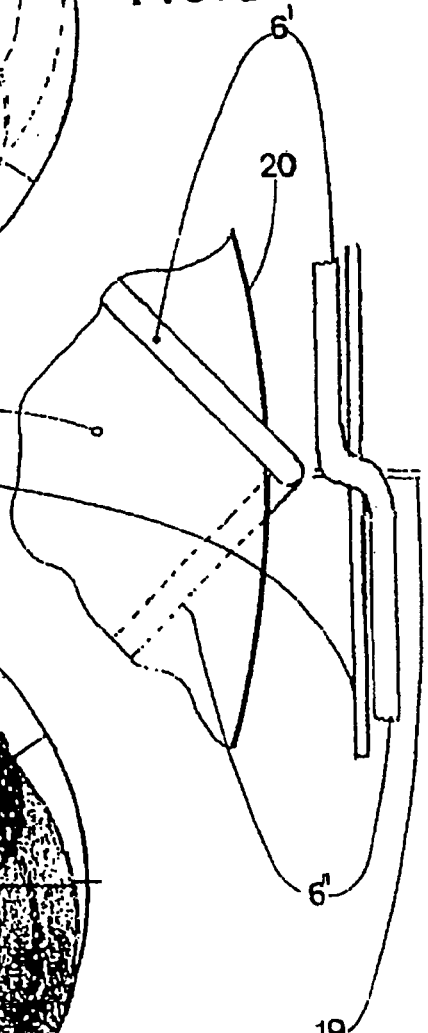
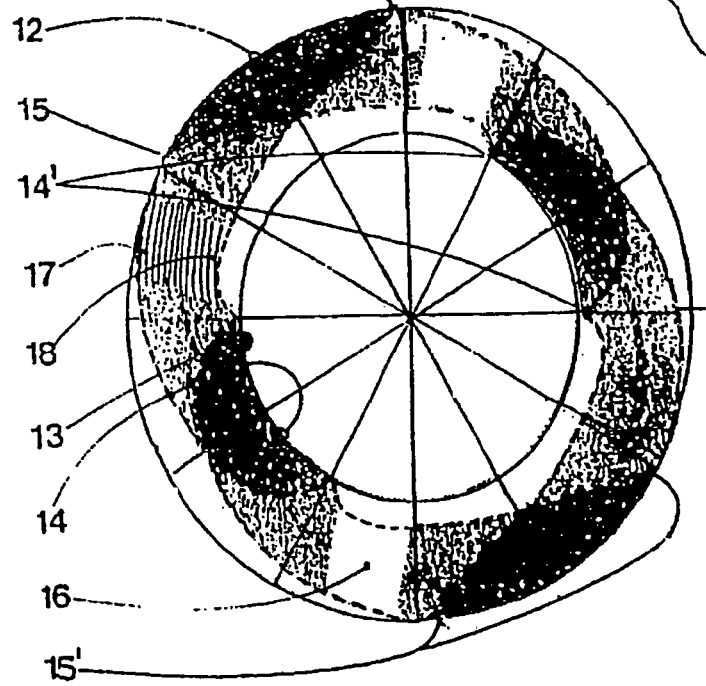

ELECTRIC MOTOR WITH CIRCULATOR PUMP

PRIOR APPLICATION

This is a continuation in part of application Ser. No. 10/151,809, filed May 20, 2002 now U.S. Pat. No. 6,736,616.

FIELD OF THE INVENTION

The invention refers to an electric motor, comprising a rotor and a stator, whereby the rotor is spherically supported.

Such electric motors for instance are used in circulator pumps, whereby the bearing can have a ball-shaped sliding body to spherically support the rotor. Such electric motors can be built with small axial height and are quiet due to a low play of the spherical bearing and have only little wear.

The invention has the task to build such an electric motor with a high efficiency.

SUMMARY OF THE INVENTION

According to the invention this is solved by the following measures: The rotor creates a magnetic field, the configuration of the rotor facing the stator is spherical and the rotor and stator are designed in such a way that an axial magnetic holding force, which keeps the rotor on a spherical bearing, is larger than a maximal axial counterforce.

It is possible to realize high efficiencies by using a rotor which has permanent magnets creating the magnetic field, and which therefore has no losses. In addition, eddy-current losses can be decreased because the stator can be built in a more compact fashion.

By adjusting the magnetic holding force it is possible to keep the rotor from lifting off the bearing by magnetic forces even when the motor is switched off. Especially, the rotor and stator are designed in such a way that a magnetic force at one end of the rotor is larger than at the opposite end, so that a holding force results, which even with the maximal counterforce, for instance a hydraulic counterforce, presses the rotor against the gliding surface of the spherical bearing.

According to the solution of the invention an electric motor with small axial height can be realized.

Thus electric motors with spherical bearings can be realized, which have a high efficiency and at the same time can take advantage of the above mentioned advantages of the spherical bearings.

It is especially advantageous when a yoke of the stator is arranged around the rotor. This results in a simple design of the stator and yoke. Especially no teeth are required to keep the windings in place; such teeth create increased eddy-current losses due to the longer magnetic paths. In the solution of the invention the paths are minimized. Such a motor can be built compact with low axial height. Either a sufficiently large magnetic force can be provided to keep the rotor on the spherical bearing, or a counter-bearing which prevents the lifting off of the rotor can be used.

The design of the stator can be simple, when the yoke surrounding the rotor is closed and especially when it is annularly arranged around the rotor.

It is especially advantageous when the surface of the yoke facing the rotor is spherical. This results in a simple configuration of the yoke, which especially avoids eddy-current losses. In addition a sufficiently large distance between the rotor and the magnetic yoke can be achieved, which results in a large air gap, which makes it possible to arrange the windings of the stator within the air gap. By adjusting the holding forces of permanent magnetic poles of the rotor, it can furthermore be achieved that an axial magnetic holding force results, which is larger than a maximal counter force, for instance a hydraulic counter force.

This makes it possible to realize a synchronous electric motor with a spherical bearing.

It is intended that rotor and yoke are essentially concentric which makes it possible to adjust a remaining force which keeps the rotor of the electric motor on the bearing under all operating conditions.

It is advantageous when the yoke has a monotonously varying inner diameter in reference to the axis of rotation of the rotor so that the rotor has one side with a larger diameter and another side with a smaller diameter. This again makes it possible to achieve a resulting magnetic holding force, which keeps the rotor on the bearing. In case of a rotor with magnetized permanent magnets distributed over its diameter and with four or six poles the coercive force of the magnetic field is chosen such that the holding force is stronger than a maximal, for instance hydraulic counterforce, so that the lifting off of the rotor from the bearing cap of the bearing is prevented.

It is advantageous that the diameter of the yoke decreases in the direction of the holding force. This allows a holding force, which keeps the rotor on the bearing.

It is advantageous when the inner diameter at the end of the yoke is limited so that at this place a finite axial component of the magnetic holding force is effective; this makes it possible to achieve a resulting magnetic holding force in axial direction, which is sufficient to keep the rotor at all operating conditions on the bearing.

When the yoke at the end with the smaller diameter has such a shape that the magnetic holding force is larger than the maximal axial counterforce, the advantages of electric motors with spherical bearings can be combined with synchronous motors with permanent magnetic rotors. This means that a synchronous motor with a spherical bearing can be realized.

An axial magnetic holding force can be adjusted when the surface of the yoke facing the stator has the shape of a section of a hollow sphere. Such a section of a hollow sphere corresponds to a hollow sphere with cut off pole regions. With a corresponding spherical configuration of the rotor and especially of the magnetic poles of the rotor a resulting magnetic holding force can be adjusted.

In addition it is advantageous when a first side of the hollow sphere has a smaller diameter than a second side, whereby the normal on the surface of the first side and the normal on the surface of the second side run parallel to the axis of rotation of the rotor, so that a magnetic coercive force can be adjusted.

In this case the first side has a larger distance from the bearing than the second side to achieve a magnetic holding force, which keeps the rotor on the bearing and does not lift it from the bearing.

It is also advantageous when the surface of the rotor facing the stator has a spherical form and when especially the magnetic part of the rotor has a corresponding spherical (outside) form to achieve the necessary magnetic holding force.

It is especially advantageous when an air gap is formed between rotor and yoke in which one or more windings of the stator are positioned. A rotor which creates a magnetic field, for instance by permanent magnets magnetized over its diameter, allows a relatively large distance between the rotor and the yoke, so that the air gap is wide enough to provide a space in which a winding or windings can be arranged. This allows the design of a compact electric motor without limiting its functions. Especially the axial height of the motor can be small.

It is especially advantageous when the rotor has permanent magnetic poles over its circumference, which create a magnetic field. In this case a relatively large distance between the rotor and the yoke can be used.

It is intended to insert a separation wall between the rotor and the stator. In a circulator pump this separation wall separates the wet part from the dry part. In this case the windings are positioned behind the separation wall in the direction of the yoke.

It is advantageous when the separation wall consists of an electrically nonconductive material to avoid eddy current losses.

It can also be of advantage when the separation wall is a thermal insulator so that the waste heat of the windings does not heat up the fluid conveyed along the separation wall in a circulator pump.

Furthermore it is advantageous when the yoke has an axial extension similar to that of the rotor. Thereby it is easy to create an axial magnetic holding force.

For the production it is advantageous when the separation wall has a connection part, which closes off a first side of the yoke.

It is advantageous when the connection part holds a post for a sliding body of the bearing. This makes it easy to assemble the electric motor in a simple and inexpensive way.

An electric motor according to the invention can be easily integrated into a circulator pump to convey a fluid or especially a liquid. Such a circulator pump can be built with a small axial height. It then is called a centrifugal pump.

In this case an impeller is connected with the rotor.

In a centrifugal pump the counter force is a hydraulic force, which is caused by the impeller.

BRIEF DESCRIPTION OF THE DRAWINGS

FIG. 8 the path of the strands in front of and behind the bobbin;

FIG. 9 a bobbin for one strand;

FIG. 10 the attachment to the periphery;

DETAILED DESCRIPTION OF THE PREFERRED EMBODIMENTS

Figure 1:
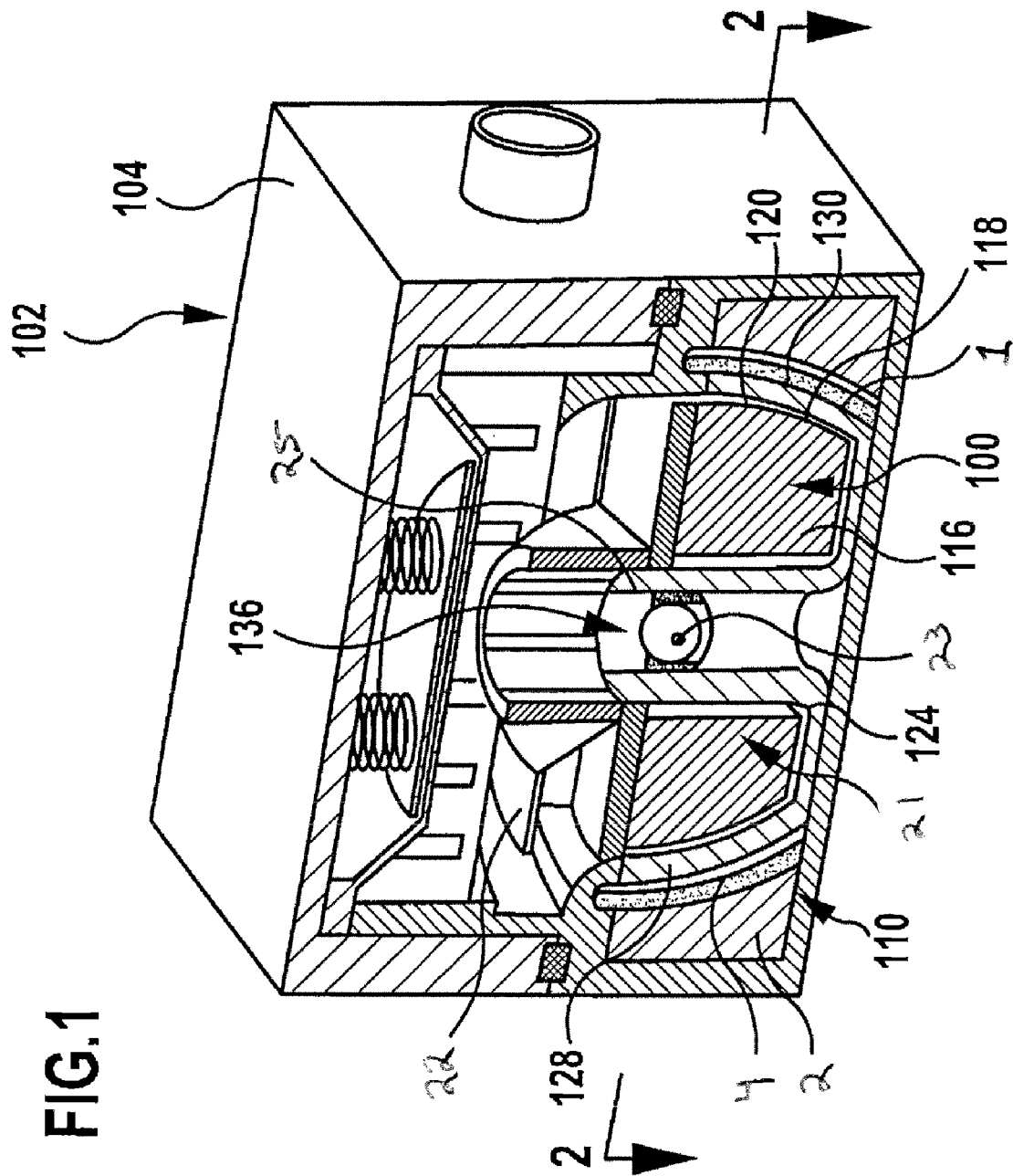
FIG. 1 shows a perspective cross-section of a circulator pump according to the invention.

An exemplified embodiment of an electric motor according to the invention, which as a whole is labeled 100 in FIG. 1 is part of a circulator pump 102, so that a pump-motor-unit is formed. The circulator pump 102 comprises a housing 104 in which the electric motor 100 is positioned. The circulator pump—as described below—is designed as a centrifugal pump.

The electric motor comprises a rotor 21, which forms a unit with an impeller 22 to form a rotor-impeller-unit.

The electric motor furthermore comprises a stator 110 with one or more windings 4 and a yoke 2. This yoke 2 consists of a soft magnetic material and especially is pressed from soft iron powder. The soft iron parts are insulated against each other. The stator 110 forms a unit with the housing 104.

The rotor 21 produces a magnetic field. To this effect it comprises one or more magnetic elements 116 which are especially permanent magnets which are magnetized in radial direction. Preferably the magnetic elements 116 are formed by permanent magnets with high coercive field density, whereby the magnetic poles are distributed over the circumference of the rotor with alternating polarity. There can be either two poles or a multiple of two poles. Preferably four poles are used.

A surface 118 of the rotor 21 facing the stator 110 is part of a spherical surface, whereby the magnetic elements 116 follow the configuration of this surface. As a protection for these magnetic elements 116 the rotor 21 has a cover 120, consisting of plastic or stainless steel, forming the surface 118.

The spherical surface 118 has the configuration of a section of an imaginary ball, cut perpendicular to an axis 122 (FIG. 2), which runs through the center of the imaginary ball. This axis is also the axis of rotation of the rotor 21.

An area 124 of the rotor 21 facing the housing 104 has an essentially plane surface. The same applies to an area 126 of the rotor 21 facing the impeller 22. Relative to the surface facing the yoke 2, the rotor 21 has the form of a sphere.

The winding respectively windings 4 of the stator 110 are arranged around the rotor 21 whereby the yoke 2 also surrounds the rotor 21.

Between the rotor 21 and the yoke 2 an air gap 128 is formed for the magnetic flux. Spherical surface areas, namely the surface 118 and an opposite spherical surface 130 of a wall 1 surrounding the winding respectively windings 4 form part of the air gap 128.

Wall 1 acts as separation wall to the wet part of the circulator pump and thereby as separation wall between the rotor 21 and the stator 110. It consists of an electrically non-conductive material, for instance plastic. It also can be produced from a thermally insulating material so that the waste heat of the windings 4 does not heat the liquid conveyed by the circulator pump 102.

The rotor 21 is spherically supported to form a circulator pump. Such a bearing 136 comprises a sliding body 23 in the shape of a ball, which is fixed to a pole 24. The pole 24 extends in the direction of the axis 122 and is connected to the wall 1 by an element 25. This disk shaped element 25 connects the spherical areas of the separation wall where the yoke has its smallest inner diameter.

The pole 24 is connected to the housing 104. The center point of the sliding body 23 lies on the axis 122 of the rotor 21. The center point of the sliding body 23 coincides with the center point of the imaginary sphere which forms the surface 118.

The bearing furthermore comprises a bearing cap 142 which for instance is made from carbon. The sliding body 23, which for instance is made from ceramic material can slide relative to the bearing cap 142. The bearing cap 142 is fixed to the rotor 21 and has a spherical sliding surface 144 for the spherical sliding surface of the ball-shaped sliding body 23. With this bearing 136 a circulator pump can be built.

The yoke 2 forms a ring around the rotor 21.

The surface 146 of the yoke 2 facing the rotor 21 is spherical. This surface is formed by an imaginary ball, whose center ideally coincides with the center of the imaginary ball for the surface 118 and with the center of the spherical sliding body 23. Due to production tolerances the concentricity between these imaginary balls can only approximately be achieved, which means that there can be a distance between the centers of the imaginary balls which form the spherical surfaces 118 and 146.

The air gap 128 thus is formed by opposite spherical surfaces 118 and 146 and is cup-shaped. In this air gap 128 the winding 4 is positioned.

The yoke 2 has an axial height in the direction of the axis 122, which is adapted to the axial height of the magnetic elements 116. Especially the front end 148 of the yoke 2 facing the impeller 22 is arranged close to the area 126 of the rotor 21.

The other end 150 opposite to the impeller 22 forms the opposite end of the stator 110.

An inner area between the surfaces 146 of the stator has the form of a section of a hollow sphere with a first side 152 at the end 150 and a parallel side 154 at the opposite side 148. The inner diameter of this section of a hollow sphere increases perpendicular to the axis 122 from the first side 152 to the second side 154, so that the inner diameter at the first side 152 is the smallest inner diameter of the section of a hollow sphere.

The rotor 21 has a spherical shape and is adapted to the shape of the yoke 2, so that it also has a first side 156 with smaller diameter, which faces the first side 152 of the section of a hollow sphere of the yoke 2. Originating from this first side 156 the diameter of the rotor 21 increases in the direction of the opposite second side 158 and especially the totality of the magnetic elements 116 increases monotonous perpendicular to the axis 122.

Between the sides 156 and 158 the rotor 21 has the outer form of a section of a sphere, which is positioned in the section of a hollow sphere of the yoke 114.

Due to the magnetic forces between the magnetic elements 116 and the stator 110, the rotor experiences a magnetic force, which with its axial component 26 presses the rotor 21 with the bearing cap 142 onto the sliding body 23.

The rotor experiences an axial counterforce 27, which tries to lift the rotor 21 away from the sliding body 23. In a circulator pump a hydraulic axial force created by the impeller 22 causes this counter force.

The rotor 21 and the stator 110 are formed in such a way that under all conditions the axial component 26 of the magnetic force is larger that the counter force 27, so that the rotor 21 at all times is pressed against the sliding body 23. This also applies for the situation immediately after turning off the electric motor; when the hydraulic force is still effective.

The magnitude of the holding force of the part of the rotor 21 creating the magnetic field is chosen in such a way, and the air gap 128 has such a large radial extension, that the axial component 26 of the magnetic force is larger than a maximal counterforce 27 acting in the axial direction 122. Especially the yoke 2 in an area at the first side 152, i.e. the side with the smaller inner diameter of the yoke 2, is formed in such a way that this condition is fulfilled.

At the same time the air gap 128 is chosen such that the winding or windings 4 forming the stator 110 can be positioned in the air gap.

The magnitude of the magnetic holding force is sufficiently large to allow a relatively large air gap 128 in which again the winding or windings 4 of the stator can be placed. The yoke 2 is ring shaped and surrounds the rotor 21.

This allows an electric motor 100, respectively a circulator pump 102, with small dimensions and low noise. At the same time the electric motor 100 has a high efficiency which is especially due to its permanent magnetic rotor 23 which creates the magnetic field, and therefore does not create any losses. The stator 110 of the motor according to the invention has a simple shape; especially no teeth are necessary which would increase the eddy current losses.

According to the invention a synchronous motor with spherical bearing 106 can be realized.

Examples for the design of the winding or windings within the air gap 128 are described below.

Electric motors for circulator pumps with spherical rotor, supported on a ball, have small dimensions and low noise. Synchronous motors with permanent magnetic rotors have high efficiencies since the rotors do not create losses. The invention relates to electric motors with spherical rotors in which the winding is arranged around the rotor.

Pumps with spherical rotors have the disadvantage that the winding is supported by teeth of complicated stators lying in axial direction beside the rotor, which results in high eddy current losses. In addition, the rotor is not held in its position on the ball as soon as the motor is switched off. Synchronous motors are only known with cylindrical rotors which cannot easily be converted into spherical rotors.

The invention avoids both disadvantages. Motors according to the invention have a rotor, which contains a permanent magnet magnetized over the diameter. According to the invention such a rotor allows a distance between the periphery of the rotor and the magnetic yoke, so that it is possible to arrange the winding within the air gap. The inner surface of the yoke, the separation wall and the rotor run in concentric spherical zones. This means that the motor has a considerably smaller diameter at one of its axial boundaries than at the other axial boundary. This results in axial components of the magnetic forces at the axial ends which are so different from each other that a resulting force remains which attracts the rotor to the smaller diameter of the ring shaped yoke, whereby this force has to be sufficient to secure the safe support of the rotor on the centrally arranged bearing ball in all working conditions, even when the motor has been switched off. According to the invention the separation wall between the rotor and the winding can consist of a nonmetallic material, for instance a polymer, so that the considerable eddy current losses, which are unavoidable with metallic material, do not exist. An important advantage of the invention is that the motors will have an extremely short axial height.

Figure 2:
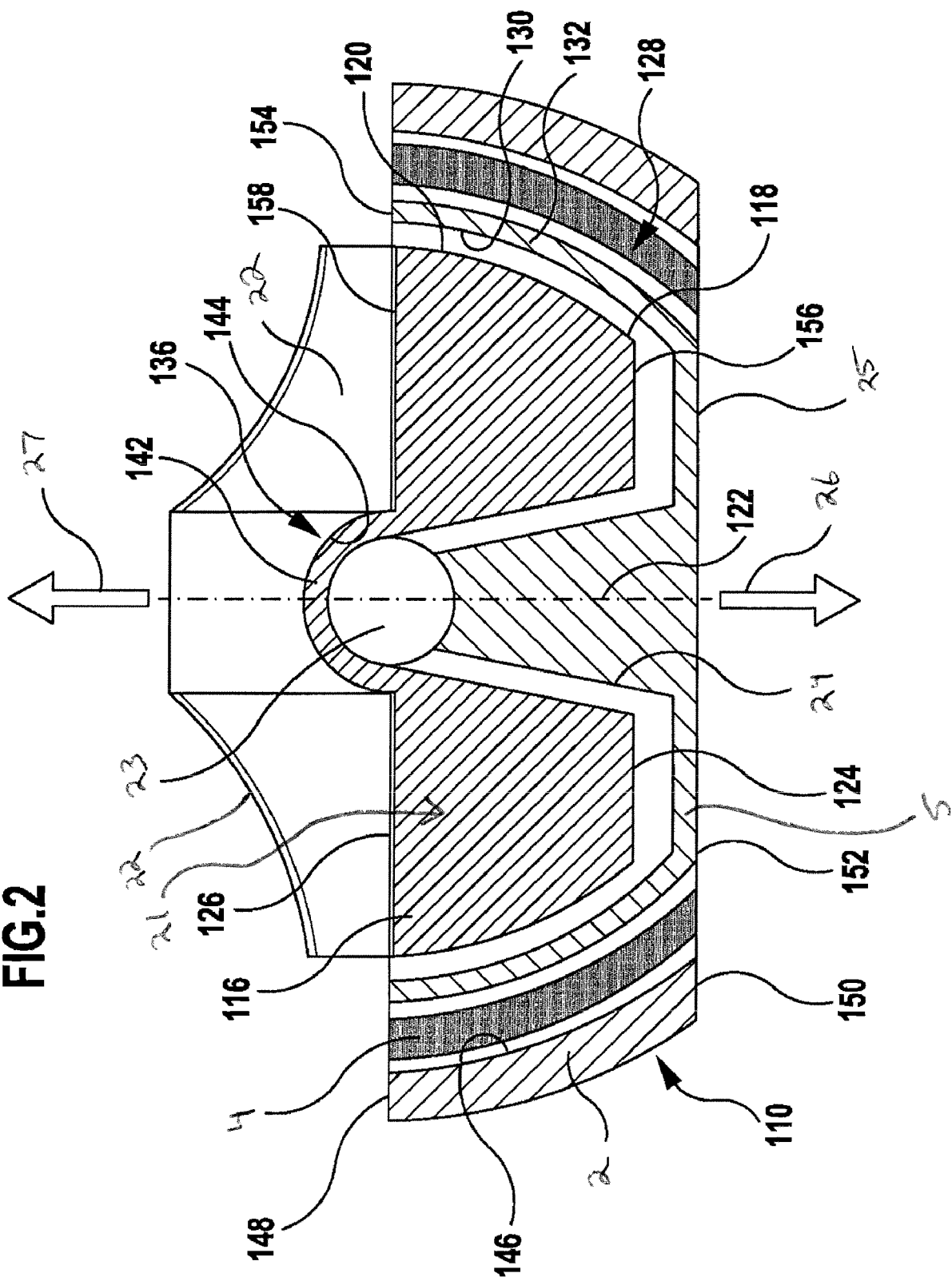
FIG. 2 shows an enlarged partial view of the circulator pump according to FIG. 1 Further embodiments show.

FIG. 2 shows a cross-section through the active parts of a centrifugal pump according to the invention. Rotor 21 forms a unit with pump impeller 22, which unit is supported on stationary ball 23. Ball 23 is connected to a bearing pole 24, which forms a unit with the circular disc 25. This disc closes the smaller diameter 5 of the separation wall 1. Separation wall 1 separates the wet zone with the rotor-pump impeller unit 21, 22 from the outer area with the winding 4 and the yoke 2. The inner surface of the yoke 2 forms a spherical surface running concentrically to the outer surface of the separation wall 1. The interaction of the rotor 21 with the inner area of the yoke 2 results in the axial force which presses the rotor 21 onto the ball 23, whereby the axial magnetic component 26 must be larger than the hydrodynamic component 27 caused by hydrodynamic forces acting in the opposite direction.

Figure 3:
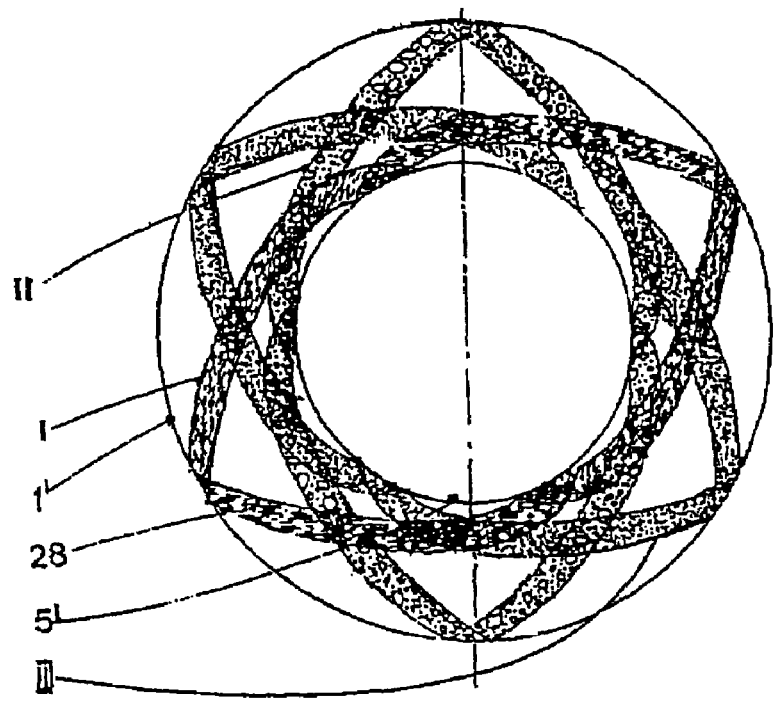
FIG. 3 a top view of the separation wall with the winding.

FIG. 3 shows in schematic presentation a plane view of the spherical separation wall 1 enclosing the spherical rotor. Preferably this separation wall is made from a polymere. In the space between the separation wall 1' and the magnetic yoke 2 in FIG. 2, which conducts the magnetic flux, two layers of windings 4 (FIG. 1) for three phases are placed. The path of the winding in this schematic presentation for phase I is represented by the dotted winding region while the winding region marked by tiny circles represents winding II and the region with ripples represents winding III. In many applications the removal of the waste heat by the fluid conveyed is disadvantageous (for instance for circulator pumps for fish tanks or for developer fluids for photo applications. A thermally insulating separation wall 1 (in FIG. 2) can prevent the heat flux of the winding from heating up the liquid conveyed.

Figure 4:
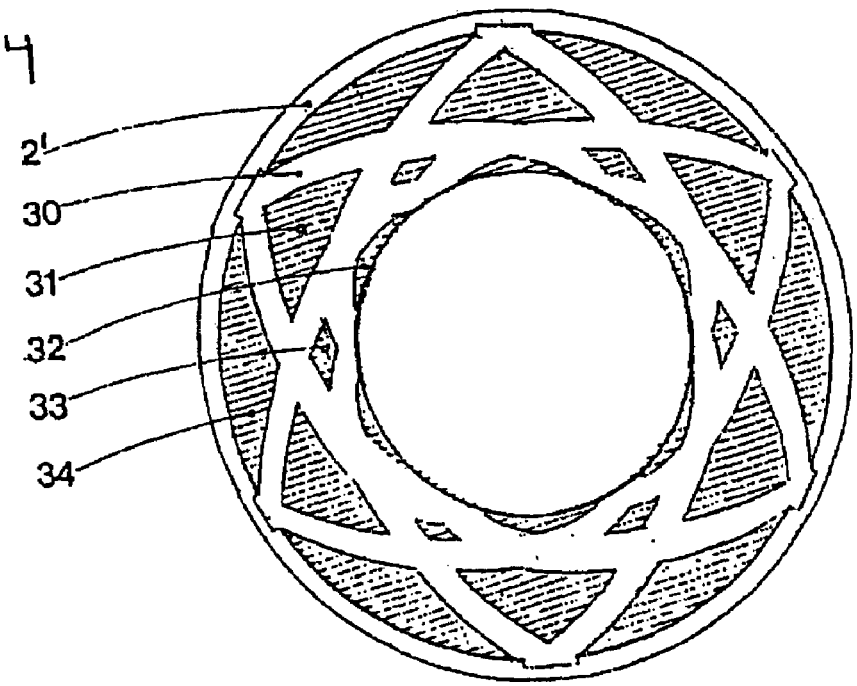
FIG. 4 the follow spherical yoke.

FIG. 4 shows a plan view of a magnetic yoke 2'. The inner surface has grooves 30 into which the winding strands 28 are placed according to FIG. 3. Between these winding strands 28 the hatched sections 31, 32, 33, 34 of the yoke reach the spherical surface. When the grooves 30 are as deep as the thickness of the winding, the inner surface of the yoke 2' will be without any protrusions so that an insulating layer easily can cover the whole surface. As material for the yoke preferably iron granules can be used, the granules of which are insulated against each other. The iron powder will be pressed into the configuration shown.

Figure 5:
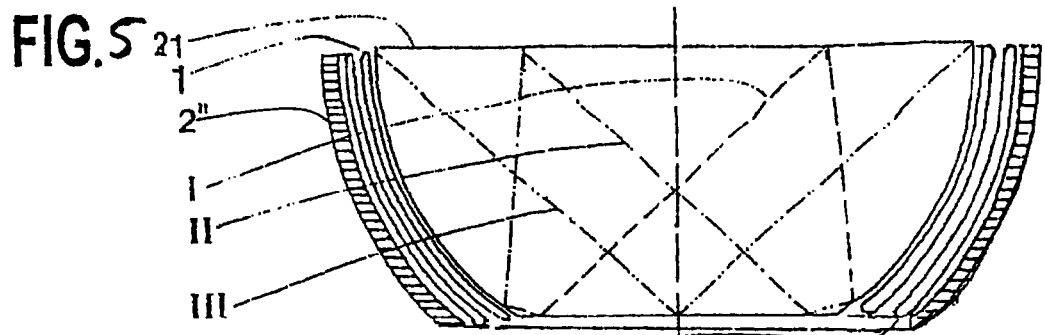
FIG. 5 a cross-section through the yoke and the exposed separation wall.

FIG. 5 shows in schematic presentation a cross section of the spherical rotor 21 parallel to the axis of rotation together with the spherically shaped separation wall 1 which may consist of a polymere. In the space between the separation wall 1 and the magnetic yoke 2, which conducts the magnetic flux, the windings 4 for three phases are arranged. The path of the winding in schematic presentation follows the dashed line I for phase I, the dot-dashed line II for phase II and the double dot-dashed line III for phase III.

Figure 6:
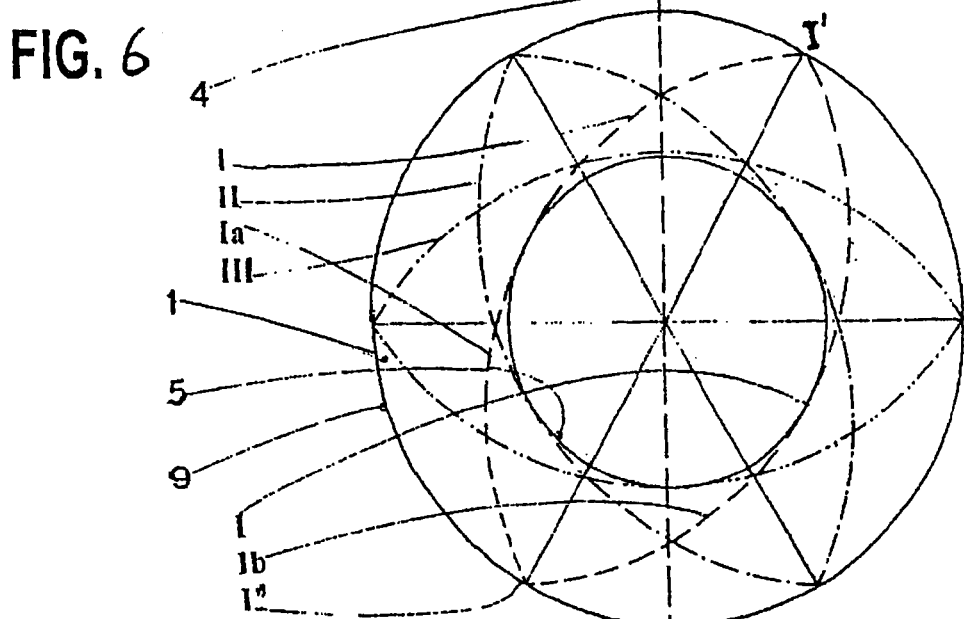
FIG. 6 the distribution of the wires on the separation wall for one winding strand.

FIG. 6 shows a plane view of separation wall 1 with the path of the three strands I, II, III. Each strand starts at the periphery 9 of the ring-shaped yoke 2, goes to its inner rim 5 and from there is bent by 180° back to the periphery 9, at I'. Thereafter it runs back to rim 5 and from there to its starting point I".

Figure 7:
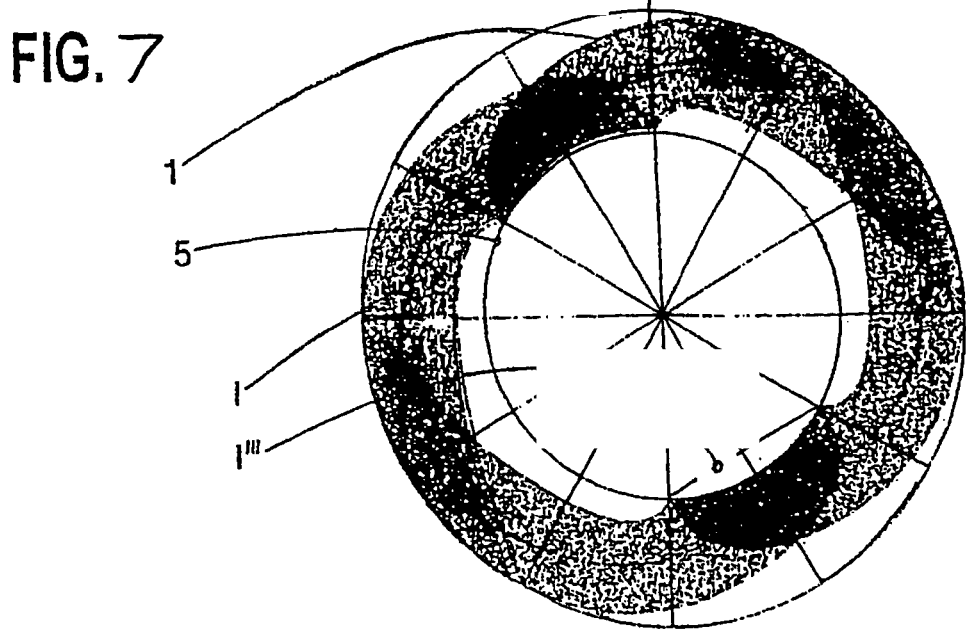
FIG. 7 the maximal permissible width of the strands.

As can be seen in FIG. 7, winding I has a width I'" which is less than one sixth of the circumference 5 of the rim with the small diameter of the separation wall 1.

FIG. 8 shows the path of two single wires shown with the help of the dashed line for wire 6 and the uninterrupted line of wire 7. In the area of the circumference 5 of the smaller rim, wire 6 is bent around the imaginary tangent line 8, turned to the left and bent like a hair pin. From there it runs behind a spherical bobbin 10 as section 6' to the circumference 9 of the rim with the larger diameter. Wire 7 runs parallel to wire 6 on the side of the rim with the larger diameter. When reaching the rim of the smaller diameter it runs below wire 6'. Thereafter wire 7 is bent in the same manner as wire 6 around the imaginary tangent line 8 on the rim of the bobbin and now runs as wire section 7' parallel to the wire 6' on the inner side. At the large circumference 9 the wire 7' is bent in the same manner by wrapping around the imaginary tangent line 8' at the periphery.

FIG. 9 shows a spherical bobbin 10, formed of a sheet of thin-walled insulating material. In the area 16 and in the area shifted by 180° the wires run behind the bobbin 10 so that only the bobbin 10 can be seen while in area 17 and in the area shifted from 17 by 180° the wires 18 are visible. Instead of the imaginary tangential lines 8 and 8' in FIG. 8, in this presentation in the circumferential areas 14' and 15' the bobbin 10 takes the place of the imaginary tangent line. Three of the units consisting of the bobbin 10 and the windings 18, shifted against each other by 120° and 240°. respectively around the axis of rotation form the winding for a three phase motor.

Instead of using a bobbin 10 to stabilize the windings, a winding can be used in which the wires are fused together by a coating meltable by heat.

FIG. 10 shows in two planes the bending of a wire 6' at the periphery 20 of the bobbin 10. Each wire is bent twice around two imaginary axes, which run perpendicular to the axis of rotation. In addition the wire section 6' in front of the bobbin 10 and the wire section 6" behind the bobbin 10 are bent around an imaginary axis 19 which runs parallel to the axis of rotation.

Figure 11:
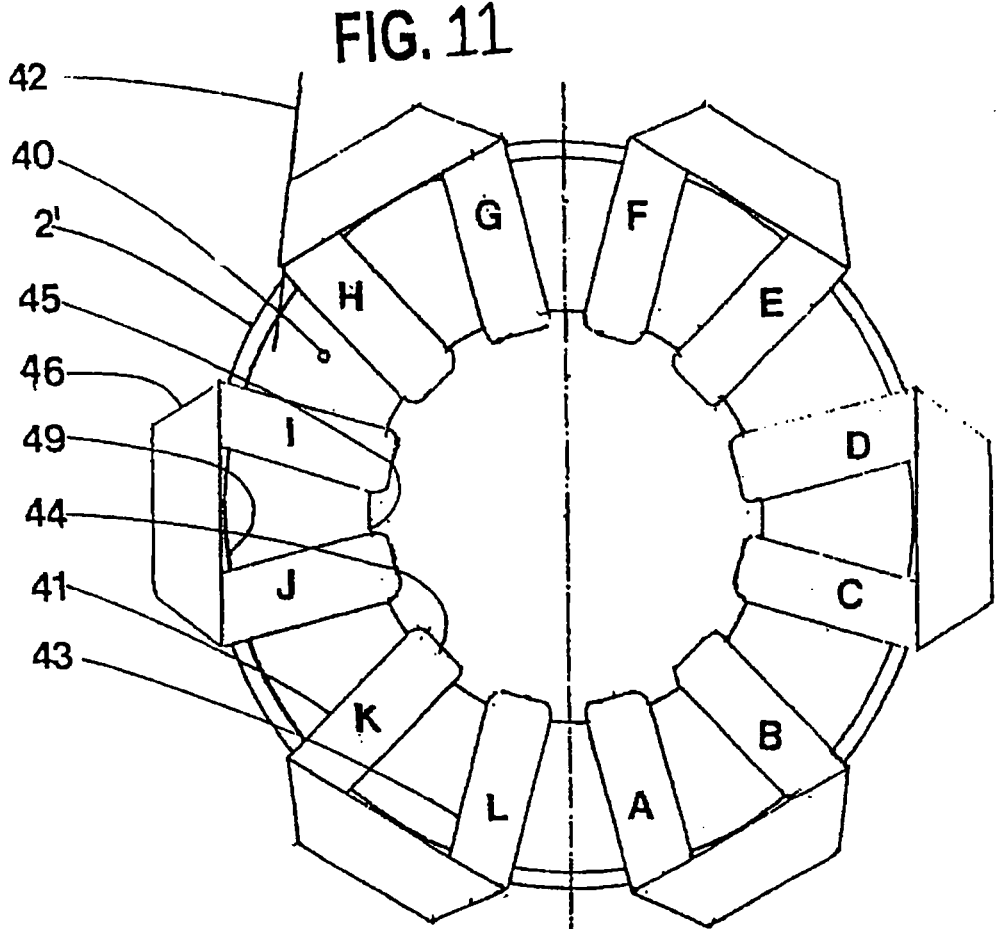
FIG. 11 the top-view of a yoke with flat winding.
Figure 12A:
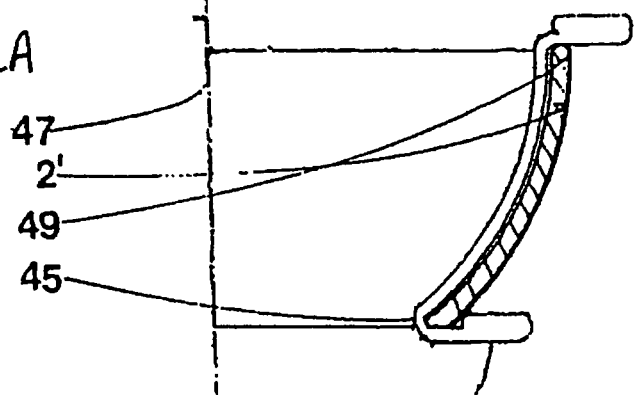
FIG. 12A a cross-section through FIG. 11.
Figure 12B:
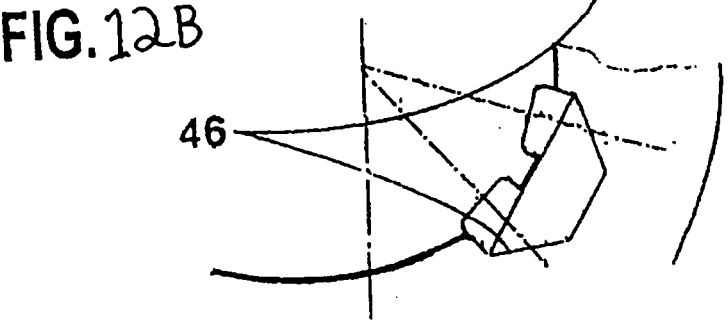
FIG. 12B a view of FIGS. 11 and 12A from below.

FIGS. 11 and 12 show another configuration of the winding. Here the strand sections 41 run within the magnetic yoke 40. The strands 41 consist of parallel wires. The strand section 41 runs from the rim 45 with the smaller diameter of the magnetic yoke to the rim 49 with the larger diameter. There the strand is folded around the imaginary axis 42, which runs almost parallel to the diameter of the magnetic yoke 2' and now lies in a first plane at the outer periphery of the magnetic yoke 2'. Then it is folded back according to strand section 43, and then follows the spherical curvature of the magnetic yoke 2' where it is connected to the neighboring strand A at the rim 45 of the smaller diameter of the yoke 2'. Here the end 44 of the strand section is folded back around the smaller rim 45 as can be seen in FIG. 12A and is now bent to the outside where it lies in a second plane at the smaller diameter 45 of the yoke 2' which runs parallel to the first plane on the larger diameter 49 of the yoke 2'.

Figure 13:
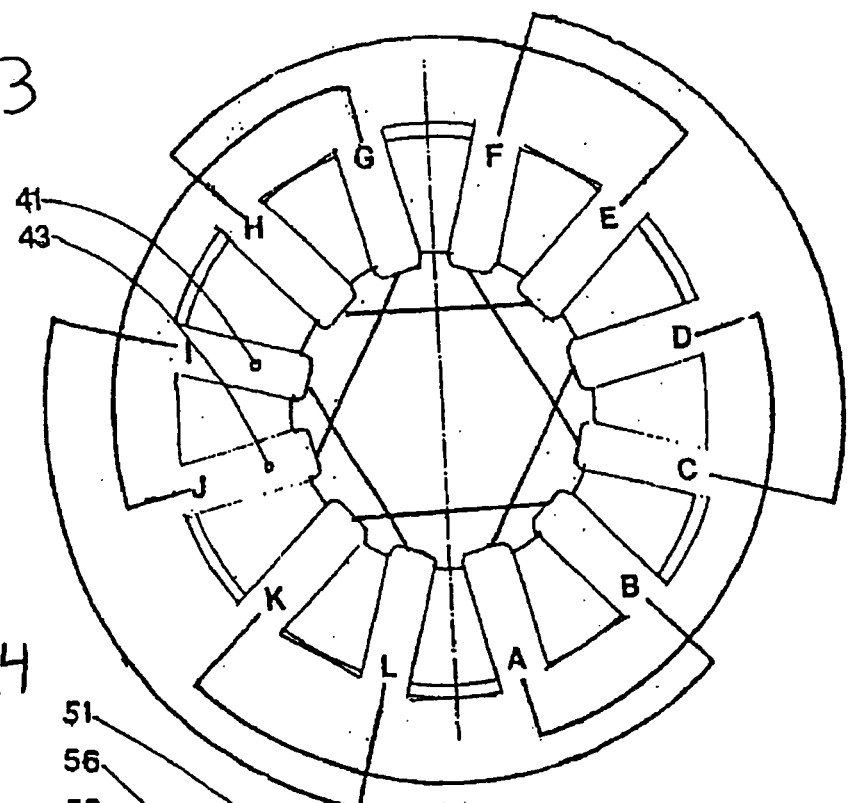
FIG. 13 the winding pattern for a 4-pole-motor.

In FIG. 13 the same yoke 2' is shown with the strand sections A to L. The strand sections 41 and 43 belong to a four-pole three-phase motor. This motor requires the following connection according to the winding pattern for a four pole three phase motor:

| | | |
|---|---|---|
| A with D | G with J | C with F |
| I with L | E with H | B with K |

For motors with two phases the number of the strand sections 41, 43 has to be increased to a larger number, which is divisible by eight.

Figure 14:
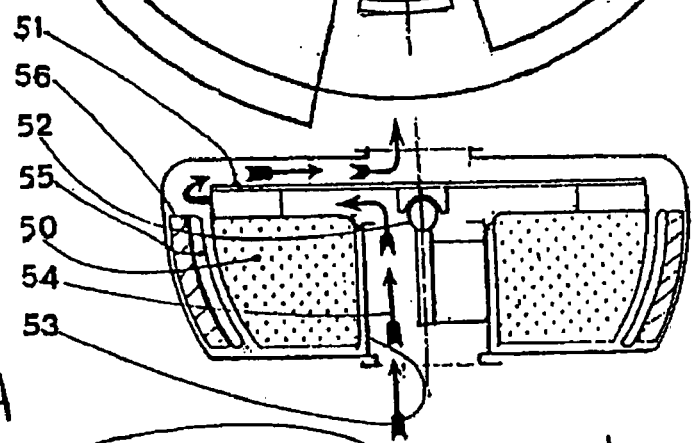
FIG. 14 a circulator pump-motor-unit with coaxial flow.

FIG. 14 shows in schematic presentation a cross section through a pump-motor-unit wherein the flow is guided from one axial end to the other. In the simplest version this motor has no separation wall so that also the electrical part of the motor is exposed to the liquid conveyed, requiring that the liquid should be electrically non-conductive. The rotor 50 forms a unit with the pump impeller 51 which unit is rotatably supported by a ball 52. The ball 52 is fixed to the suction tube 53 by three fins. The flow follows arrows 54. In contrary to the pump shown in FIG. 2, in this pump with coaxial flow the magnetic force and the hydraulic thrust work in the same direction. The winding 55 which is in contact with the fluid conveyed lies on the inner surface of the magnetic yoke 56.

Figure 15A:
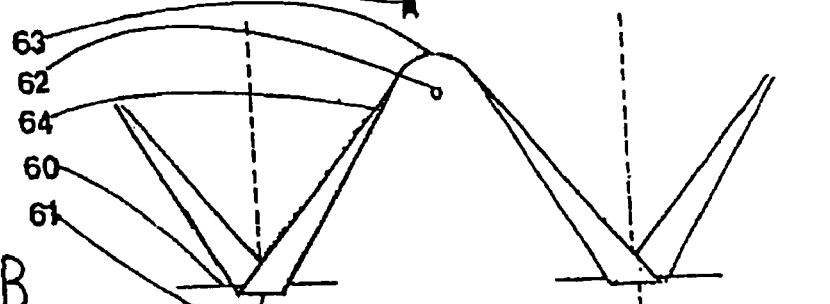
FIG. 15A the first step of the production method for a strand
Figure 15B:
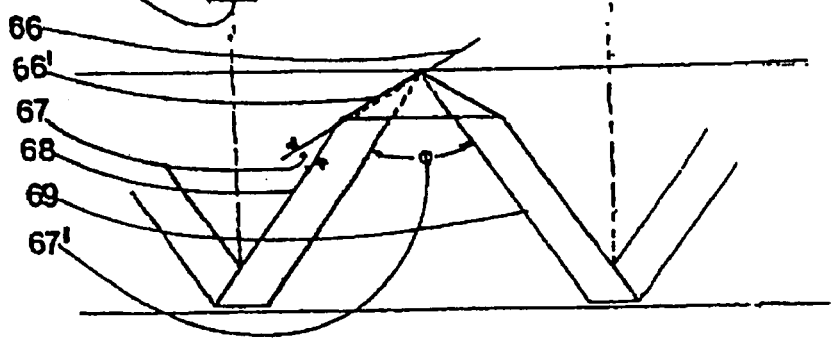
FIG. 15B the second step of the production method.

FIGS. 15A and 15B show a production method for a strand of the winding, which starts from a helix with a large diameter. While the production of the windings de-scribed before requires to pass the wires through a hole like in a transformer with a ring-shaped core, the winding pattern shown here starts with a helix which consists of a layer of single wires which are fused together. In a first step the helix is wound, in a second step as can be seen in FIG. 14A for two-pole motors, the circumference of the helix is divided into four equally long sections 61 which are folded around tangentially extending imaginary axes 60. Then the portion in the middle of the section will be bent around a radially extending imaginary axis 62, forming an arc 63 whereby the strand portions 64 will be twisted by 90°. In a third step according to FIG. 14B the arc 63 will be folded such that the two rims of strand portions 68 and 69 will meet. Thereafter the rest of arc 63 with the strand portions 68 and 69 is folded around the imaginary axis 66 to form a fold, which follows the imaginary axis 66 and which includes an angle 67 of about 30° with the strand portion 68. The two strands 68 and 69 enclose a much larger angle 67'. The winding for two-pole motors now forms a configuration similar to a crown, which will be placed within the air gap between the rotor and the magnetic yoke.

Figure 16:
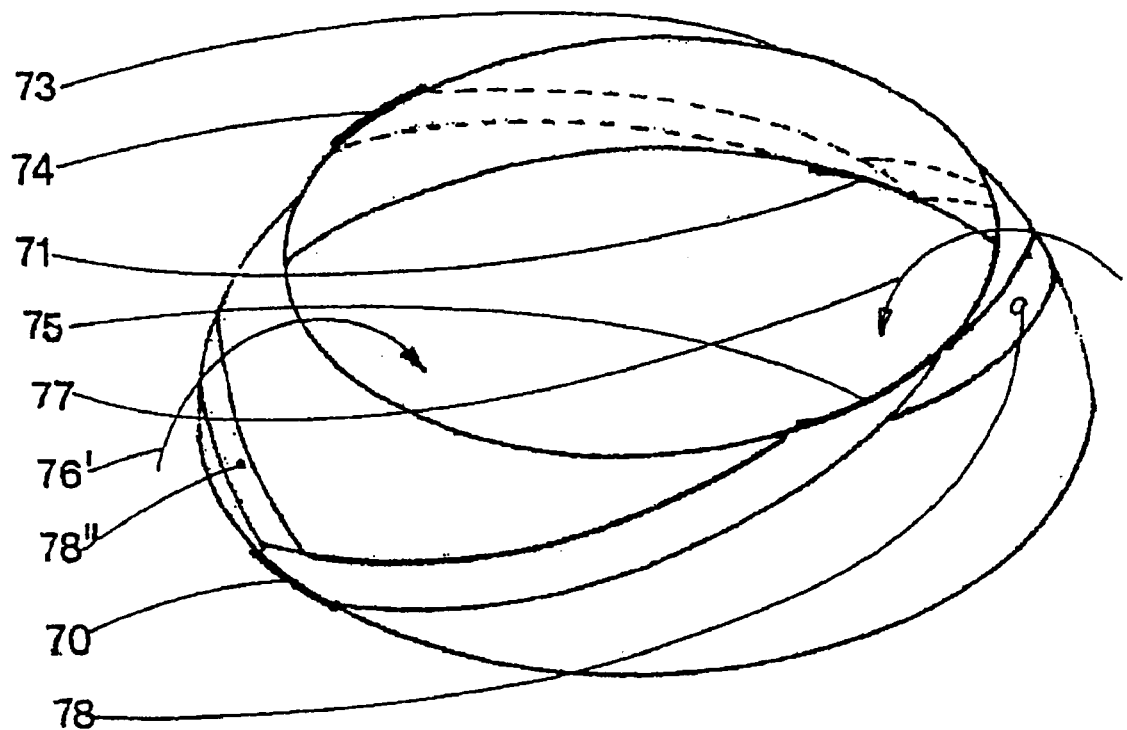
FIG. 16 a further alternative for the production method.

FIG. 16 shows another winding pattern for a two-phase four-pole motor. Also this winding starts from a helix. In a second step the helix will be folded around an imaginary axis 70, which axis runs parallel to a tangent on the rim with the larger diameter in the same manner as described in FIG. 15A. In a third step the arched portion in between will be twisted to the inside of the bobbin 73 relative to its rim with the smaller diameter by half a turn according to the arrows 76' and 77, whereby a second folding 75 becomes possible. Thereafter the neighboring section 78' will be twisted in the same sense of rotation. Now the remaining portion will be folded twice in the same manner so that portion 78" reaches the starting point 70. The folding areas can be seen along the circumference at 70, 75, 71 and 74. For a better understanding the strands are presented in a smaller fashion than necessary for the full use of the available winding area. In the remaining area the winding with the same pattern for the second phase, shifted by 90° around the axis of rotation, will be placed.

The centrifugal pump driven by an electrical motor which forms a unit with the pump with a winding system and a spherical rotor to drive the pump impeller, which forms a unit with the rotor, which unit is pressed by magnetic forces onto a centrally arranged ball, comprises a rotor 21 which has permanent magnetic poles distributed over its circumference and whose coercive force allows such a large radial distance between the rotor 21 and a soft magnetic ring-shaped yoke 2, 2", which forms the magnetic loop, whose axial extension is defined by rims with a larger and a smaller diameter, that the winding strands 4 can be placed into the air gap, whereby the surface area of the yoke 2, 2' close to the small diameter 5 causes in cooperation with the rotor 21 such a large axial component 26 of the magnetic force that it exceeds the hydraulic axial force 27 created by the pump impeller 22, whereby the rotor 21 under all operative conditions, including the situation directly after shutoff, in which the hydraulic thrust at the beginning still is effective, is pressed against the ball 23 and the winding strands 4 find place within the ring shaped area between the rotor and the yoke 2, 2'.

Between the rotor 21 and the winding 4, 55 a separation wall 1 in the shape of a segment of a sphere is placed, which separates the wet area from the dry area.

The separation wall consists of a material which is electrically non-conductive. It can also be built from stainless steel.

The separation wall can be thermally insulating.

The surface of the yoke 2 facing the rotor runs on a spherical surface.

Preferably, the yoke 2 has an axial extension of a size similar to that of the rotor 21,40.

Preferably, the strand sections of the winding 4, 28, 55 do not extend the axial extension of the ring shaped yoke 2, 2'.

The ring shaped yoke 2 can have magnetically conductive areas 31, 32, 33, 34 between which the strands of the winding run in grooves 30.

The ring shaped yoke 2" can also be built from sheet metal rings.

The yoke 2, 2', 56 can consist of iron granules whose particles are electrically insulated from each other.

The strand sections of the winding 4 can run on lines oblique to the axis of rotation on the outer surface of a spherical zone shaped separation wall 1, which lies between the rotor 21 and the winding 4, whose axial extension almost coincides with the axial distance between the rim with the large diameter 9 of the separation wall 1 and the rim with the small diameter 5.

Each wire 6, 7 of the winding is bent by 180° for instance around an imaginary tangent 8, 8', which runs parallel to the periphery of the rim 19 with the large diameter 9 and parallel to the rim with the small diameter 5.

Bobbins 10, formed of a sheet of insulating material are provided for the strand sections of the winding attributed to the phases, which bobbins run on an imaginary spherical zone and have two areas 15' which touch the circumference 9 with the large diameter of the separation wall 1 and two further areas 14' which touch the circumference 5 of the smaller diameter of the separation wall, and around which each strand 17 of the winding is bent in such a way that the section of strand 6, starting at the circumference 9 with the large diameter, each time seen in the direction of rotation of the rotor 21, runs in front of the bobbin 10 and that the strand section 6' starting at the circumference of the smaller diameter 5 runs behind bobbin 10.

The bobbins 10 can be formed by strips of an insulating film.

The separation wall 1 has a circular disc 25 which closes off the small diameter 5 and supports the post 24.

The windings can consist of strand sections 41, 43 with wires running parallel to each other, which within the air gap follow the outline of the ring shaped yoke 2', 40, whereby the strand sections 41, 43 at their ends 45, 46 are bent over the rim of the ring shaped yoke 2, 40 to the outside and are folded around a geometrical axis 42.

The strand sections for a four-pole operation, hereafter labeled with letters, must be connected in the following pattern: A with D, G with J, C with F, I with L, E with H and B with K.

Each strand of a winding is produced from helices of wires by suitable folding.

In addition a procedure according to the invention for the production of a winding for electric motors according to the invention requires the following steps:
   a) the wires will be wound into a helix of large diameter;
   b) preferably, the wires are fused together;
   c) the helix will be folded at a number of areas 61, which have the same distance from each other, around axes 60, which, depending on the number of poles, form an angle of for instance 450 between each other.
   d) thereafter, the helices are bent like a crown, whereby the single strand sections 64 are twisted by 90°, so that between two areas arcs 63 are formed whose imaginary bending axes 62 are directed perpendicular to the imaginary axes 60;
   e) thereafter, each arc 63 will be folded in such a way that the helical areas 64 are turned into the direction of the imaginary axis 60,
   f) thereafter, a triangular configuration 66' is created by folding around the imaginary axis 66, which encloses an angle 67 of approximately 30° with the helical area 68.

We claim:
1. A circulator pump, comprising:
   a rotor and a stator, whereby the rotor is supported on a spherical bearing; and
   an impeller connected to the rotor, wherein:
the rotor comprises permanent magnetic poles distributed over a circumference of the rotor with alternating polarity, said poles creating a magnetic field,
a surface of the rotor facing the stator has a spherical configuration,
substantially all of an axial magnetic holding force, which keeps the rotor on the spherical bearing, is generated by the magnetic field created by the permanent magnetic poles interacting with a stator yoke,
the axial magnetic holding force is substantially larger than an axial counterforce under all conditions,
the axial counterforce is a hydraulic force created by the impeller, and
an electric motor formed by the rotor and the stator is a synchronous motor.

2. The circulator pump according to claim 1, wherein the stator yoke is arranged around the rotor.

3. The circulator pump according to claim 2, wherein the yoke surrounding the rotor has a closed configuration.

4. The circulator pump according to claim 2, wherein the yoke is arranged annularly around the rotor.

5. The circulator pump according to claim 2, wherein the yoke has a spherical surface facing the rotor.

6. The circulator pump according to claim 2, wherein the rotor and the yoke are substantially concentric to each other.

7. The circulator pump according to claim 2, wherein the yoke has an inner diameter which varies monotonously perpendicular to an axis of rotation of the rotor.

8. The circulator pump according to claim 7, wherein the inner diameter of the yoke decreases in a direction of the magnetic holding force.

9. The circulator pump according to claim 7, wherein one end of the yoke has a finite diameter.

10. The circulator pump according to claim 2, wherein a surface of the yoke facing the rotor has a shape of a section of a hollow sphere.

11. The circulator pump, according to claim 10, wherein a first side of the section of the hollow sphere has a smaller diameter than a second side, whereby the normals on the first side and the second side run parallel to an axis of rotation of the rotor.

12. The circulator pump according to claim 11, wherein the first side has a greater distance to the bearing than the second side.

13. The circulator pump according to claim 2, wherein the surface of the rotor facing the stator has a form of a section of a sphere.

14. The circulator pump according to claim 2, wherein between the rotor and the yoke an air gap is formed in which one or more windings of the stator are arranged.

15. The circulator pump according to claim 1, wherein a separation wall is positioned between the rotor and the stator.

16. The circulator pump according to claim 15, wherein the separation wall is made out of an electrically non-conductive material.

17. The circulator pump according to claim 15, wherein the separation wall is thermally insulating.

18. The circulator pump according to claim 15, wherein the separation wall has a connecting element, which closes it on a first side of the yoke.

19. The circulator pump according to claim 18, wherein the connecting element forms a unit with a post for a sliding body of the rotor.

20. The circulator pump according to claim 2, wherein the yoke has an axial extension which is adapted to an axial extension of the rotor.

* * * * *